United States Patent
Hardacker et al.

(10) Patent No.: US 7,562,379 B2
(45) Date of Patent: Jul. 14, 2009

(54) METHOD AND SYSTEM FOR WIRELESS DIGITAL MULTIMEDIA PRESENTATION

(75) Inventors: Robert L. Hardacker, Escondido, CA (US); Mark Champion, Kenmore, WA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 1264 days.

(21) Appl. No.: 10/744,903

(22) Filed: Dec. 22, 2003

(65) Prior Publication Data

US 2005/0136990 A1 Jun. 23, 2005

(51) Int. Cl.
*H04N 7/18* (2006.01)
*H04B 1/40* (2006.01)
*H04H 40/00* (2008.01)

(52) U.S. Cl. ............................. 725/81; 725/78; 725/85; 455/3.06; 455/74

(58) Field of Classification Search ........................ None
See application file for complete search history.

(56) References Cited

U.S. PATENT DOCUMENTS

| | | | | |
|---|---|---|---|---|
| 5,523,795 | A * | 6/1996 | Ueda ........................... | 348/480 |
| 5,999,571 | A | 12/1999 | Shin et al. .................... | 375/292 |
| 6,088,007 | A * | 7/2000 | Shioya ......................... | 345/10 |
| 6,535,029 | B2 | 3/2003 | Shih et al. ..................... | 327/65 |
| 6,564,269 | B1 | 5/2003 | Martin ......................... | 710/20 |
| 6,593,895 | B2 | 7/2003 | Nesic et al. ................... | 343/795 |
| 7,092,693 | B2 | 8/2006 | Boyden et al. ............... | 455/402 |
| 2002/0136241 | A1 * | 9/2002 | Pasqualino et al. ........... | 370/493 |
| 2003/0048851 | A1 | 3/2003 | Hwang et al. ............ | 375/240.26 |
| 2003/0097662 | A1 * | 5/2003 | Russ et al. .................... | 725/117 |
| 2003/0122931 | A1 | 7/2003 | Pasqualino .................. | 348/194 |
| 2003/0126623 | A1 * | 7/2003 | Hara et al. .................... | 725/153 |
| 2003/0145336 | A1 * | 7/2003 | Matsuzaki et al. ........... | 725/136 |
| 2003/0152160 | A1 | 8/2003 | Bauch et al. ................. | 375/295 |
| 2003/0229900 | A1 * | 12/2003 | Reisman ....................... | 725/87 |
| 2005/0120381 | A1 | 6/2005 | Yamaguchi .................. | 725/105 |
| 2005/0144468 | A1 * | 6/2005 | Northcutt et al. ............ | 713/189 |
| 2005/0223407 | A1 | 10/2005 | Fullerton et al. .............. | 725/81 |
| 2005/0289631 | A1 * | 12/2005 | Shoemake ................... | 725/118 |
| 2007/0237332 | A1 * | 10/2007 | Lyle ............................ | 380/263 |
| 2008/0123739 | A1 * | 5/2008 | Reznic et al. ........... | 375/240.08 |

OTHER PUBLICATIONS

U.S. Appl. No. 60/508,061, pp. 1-22.*

* cited by examiner

*Primary Examiner*—Christopher Kelley
*Assistant Examiner*—Usha Raman
(74) *Attorney, Agent, or Firm*—John L. Rogitz

(57) ABSTRACT

A system for sending multimedia data between a first High Definition Multimedia Interface (HDMI) component and a second HDMI component that is engaged with a displayer of multimedia data includes a first Digital Visual Interface (DVI) component receiving HDCP-encrypted multimedia data from the first HDMI component over a wire. A wireless transmitter sends data from the first DVI component to a wireless receiver, preferably at 60 GHz, and the receiver in turn sends the data to a second DVI component. Neither DVI component encrypts or decrypts data. The second DVI component sends the multimedia data to a second HDMI component for decryption and display on, e.g., an LCD or plasma display.

9 Claims, 2 Drawing Sheets

METHOD AND SYSTEM FOR WIRELESS DIGITAL MULTIMEDIA PRESENTATION

FIELD OF THE INVENTION

The present invention relates generally to wireless multimedia presentation systems.

BACKGROUND

Digital video can be transmitted from a source, such as a computer, to a display, such as a video monitor, using a protocol known as Digital Visual Interface (DVI). Having been developed primarily for computers, DVI does not envision processing audio data.

Accordingly, to extend communication protocols to digital multimedia that includes audio for the purpose of, e.g., playing digital movies and the like, a protocol referred to as High Definition Multimedia Interface (HDMI) has been developed. HDMI is similar to DVI except it envisions the use of audio as well as video data and it adds television-related resolutions. Both DVI and HDMI are intended for wired transmission, and HDMI further permits the encryption of digital multimedia using an encryption method known as High-Bandwidth Digital Content Protection (HDCP). DVI also supports HDCP as an optional characteristic.

As recognized herein, to save table space and to increase people's mobility and viewing lines in the room, it may be desirable to view the multimedia on a display using a minimum of wiring. For instance, it may be desirable to mount a projector on the ceiling or to mount a plasma display or liquid crystal high definition (HD) television display on a wall, out of the way and capable of receiving multimedia data for display without the need for wires, since as understood herein among other things data transmission lines often do not exist in ceilings or walls.

The present invention further understands, however, that not just any wireless transmission system will do. Specifically, if a wireless link such as IEEE 802.11(b) is used that has a bandwidth which is insufficient to carry either compressed or uncompressed multimedia such as uncompressed high definition (HD) video, compressed multimedia standard definition (SD) video would have to be transmitted, requiring a relatively expensive decompression module at the projector. Some links such as IEEE 802.11(a) do have a bandwidth high enough to carry compressed HD video but not uncompressed SD or HD video. Also, in the case of 802.11 (a) copyright protection may be implicated because the link is sufficiently long range (extending beyond the room in which it originates) that it can be detected beyond the immediate location of the transmitting laptop. With this in mind, the present invention recognizes the need for a very short range, preferably directional, high bandwidth wireless link that is particularly suited for the short range wireless communication of uncompressed multimedia, particularly the rather voluminous genre of multimedia known as HD video.

In any case, as mentioned above for the HDMI and DVI standards, wireless transmission is not envisioned. The present invention recognizes that to effect wireless short-range transmission of audio and video data, modifying a wireless component to process HDCP-encrypted HDMI, transmit it, and receive it on the other end of the wireless path, prior to sending it on to an HDMI display device, would entail the use of an additional HDMI transmitter and receiver. This in turn would require further licensing of keys, etc. for the added components as well as the use of HDMI components, which can be more expensive than DVI components. Also, because the HDMI wireless components would decrypt the HDCP, transmit the data, and then re-encrypt at the receiving end, the data would be "in the clear" for part of the transmission path and, hence, susceptible to unauthorized intercept.

SUMMARY OF THE INVENTION

A system includes a source of multimedia data and a first High Definition Multimedia Interface (HDMI) component receiving the multimedia data from the source. A first Digital Visual Interface (DVI) component receives, over a wire, the multimedia data from the first HDMI component, with the multimedia data received by the first DVI component being encrypted using High-Bandwidth Digital Content Protection (HDCP). The first DVI component does not decrypt or encrypt the multimedia data at any point, but it can demultiplex and decode the multimedia data to produce an encrypted baseband multimedia data. A wireless transmitter receives encrypted multimedia data from the first DVI component and wirelessly transmits the encrypted multimedia data to a wireless receiver. The encrypted multimedia data from the first DVI component includes audio data multiplexed within a video data stream. A second DVI component receives encrypted multimedia data from the wireless receiver and sends it to a second HDMI component over a wire. A displayer of multimedia data such as an LCD or plasma display receives multimedia data from the second HDMI component via at least one wire for display thereof.

In a preferred embodiment, the displayer of multimedia data may be mounted in a room in which the wireless transmitter is disposed. The wireless transmitter may wirelessly transmit the multimedia data at approximately sixty Giga-Hertz (60 GHz), and the multimedia data may be high definition (HD) multimedia data. The audio data can be multiplexed in a blanking interval of the video data stream, or it can be multiplexed with the video data stream using the falling edge of a clock signal.

In another aspect, a system for sending multimedia data including audio data and video data between a first High Definition Multimedia Interface (HDMI) component and a second HDMI component engaged with a displayer of multimedia data includes a first Digital Visual Interface (DVI) component that receives multimedia data from the first HDMI component. If desired, the multimedia data received by the first DVI component can be encrypted. A wireless transmitter receives encrypted multimedia data from the first DVI component and wirelessly transmits the encrypted multimedia data to a wireless receiver, which sends the data to a second DVI component. In turn, the second DVI component sends the multimedia data to the second HDMI component.

In still another aspect, a system for sending multimedia data which includes audio data and video data between a source end component that processes data in accordance with a first digital communication protocol and a receiving end component that also processes data in accordance with the first digital communication protocol includes a first component that processes data in accordance with a second communication protocol. The first component receives multimedia data from the source end component. A wireless transmitter receives multimedia data from the first component and wirelessly transmits the multimedia data to a wireless receiver. Also, a second component processes data in accordance with the second communication protocol and receives multimedia data from the wireless receiver. The second component sends the multimedia data to the receiving end component.

In another aspect, a system for communicating digital multimedia data includes first DVI means for receiving encrypted multimedia data and processing the encrypted multimedia data without decrypting it, and wireless transmitting means for receiving the encrypted multimedia data including video data and audio data multiplexed within the video data and for wirelessly transmitting the encrypted multimedia data. The system also includes wireless receiving means receiving the multimedia data. Second DVI means are provided for processing data from the wireless receiving means.

In yet another aspect, a module for processing digital multimedia data including audio data and video data received on a wireless link includes a wireless radio that is configured for receiving the multimedia data in encrypted form from a wireless transmitter in the same space as the wireless receiver. A DVI component receives encrypted multimedia data from the wireless receiver and is configured for sending the multimedia data, including audio data multiplexed in with video data, to a HDMI component without encrypting or decrypting the data.

In another aspect, the system may include multiplexing control data not usually found within DVI or HDMI for the display among the video data and audio data multiplexed with the video data.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
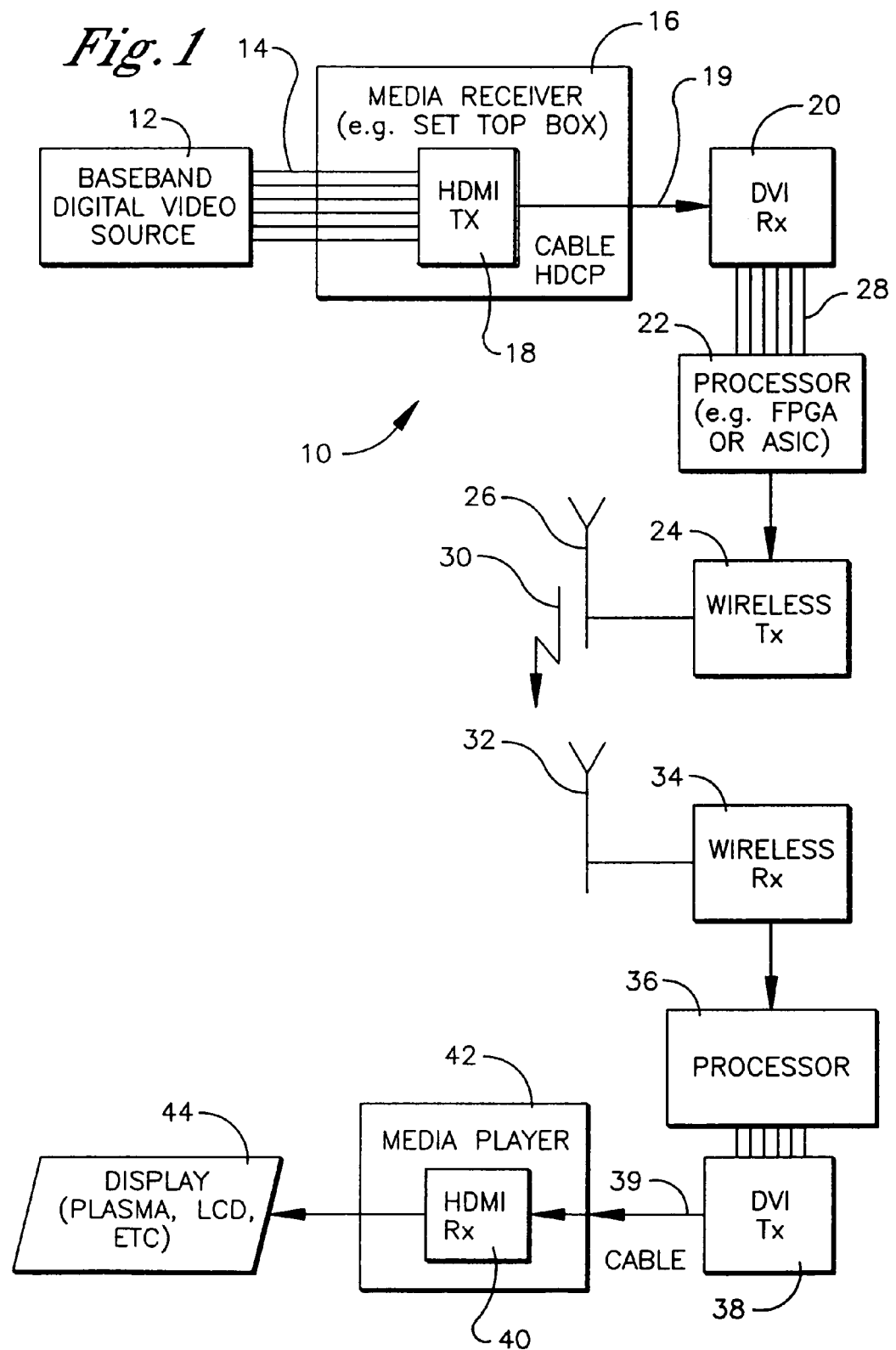
FIG. 1 is a block diagram showing the present system.

Referring initially to FIG. 1, a system is shown, generally designated 10, which includes a source 12 of baseband multimedia data, and in particular high definition (HD) digital video with audio. The source 12 may be a laptop computer or other multimedia computer or server. Or, it can be a satellite, broadcast, or cable receiver, or it can be a DVD player or other multimedia source.

The source 12 sends multiplexed multimedia data over lines 14 to a media receiver 16. The media receiver 16 may be a set-top box that can include a High Definition Multimedia Interface (HDMI) transmitter 18. The HDMI transmitter 18 employs HDMI protocols to process the multimedia data by, among other things, encrypting the data using High-Bandwidth Digital Content Protection (HDCP) and supporting TV resolutions such as 16×9 display ratios to the multimedia data.

In accordance with HDMI principles known in the art, the HDMI transmitter 18 sends HDCP-encrypted multimedia data over a cable or other wire 19 to a Digital Visual Interface (DVD receiver 20. According to the present invention, the DVI receiver 20 uses DVI protocols to process the received data. As part of the processing the HDMI transmitter 18 multiplexes the video and multiplexes the audio within the video data stream. This can be done by multiplexing the audio into the vertical blanking interval (VBI) of the video or it can be done using the trailing edge of a clock signal, or by other means. The DVI receiver 20 demultiplexes the video while passing through the audio multiplexed within the data stream. In any case, at no time does the DVI receiver 20 decrypt or re-encrypt the stream.

The encrypted multimedia data from the VBI receiver 20 is sent to a processor 22, such as an application specific integrated circuit (ASIC) or field programmable gate array (FPGA). The processor 22 processes the data for wireless transmission by a wireless transmitter 24 over a transmitting antenna 26. The processor 22 can, among other things, re-multiplex twenty four lines of video and control signals as might be present on twenty four multiplex lines 28 into two signals such as might be required to support QPSK modulation. Additional control signals for the display may also be multiplexed within the video data stream. Also, error correction may be implemented that is appropriate for wireless transmission in accordance with wireless transmission principles known in the art.

In any case, the encrypted multimedia data is wirelessly transmitted over a wireless link 30 to a receiver antenna 32, which sends the data to a wireless receiver 34. In accordance with present principles, the link 30 carries a frequency which is sufficiently high that the signal on the link substantially cannot be received outside the room. Also, multimedia may be transmitted in an uncompressed form on the link 30 such that so much data is transmitted each second that bootlegging the content is essentially untenable, although some data compression less preferably may be implemented. The data may also be transmitted in compressed form if desired. The transmitter 24 and receiver 34 (and, hence, link 30) preferably operate at a fixed (unvarying, single-only) frequency of approximately sixty GigaHertz (60 GHz), and more preferably in the range of 59 GHz-64 GHz, and the link 30 has a data rate, preferably fixed, of at least two Giga bits per second (2.0 Gbps). When DQPSK is used the data rate may be 2.2 Gbps, and the link may have a data rate of approximately 2.5 Gbps. The link may have a fixed bandwidth of two and half GigaHertz (2.5 GHz).

With this in mind, it may now be appreciated that the wireless transmitter 24 preferably includes an encoder for encoding in accordance with principles known in the art. The encoded data is modulated at approximately 60 GHz by a 60 GHz modulator and upconverted by an upconverter for transmission over the link 30 at about 60 GHz. Using the above-described wide channel and a simpler modulation scheme such as but not limited to DQPSK, QPSK, BPSK or 8-PSK, a high data rate yet simple system can be achieved. For example, when DQPSK is used, a data rate of twice the symbol rate can be achieved. For 8-PSK a data rate of 3.3 Gbps may be achieved.

It may further be appreciated that the wireless receiver 34 includes circuitry that is complementary to the wireless transmitter 24, namely, a downconverter, a 60 GHz demodulator, and a decoder. In any case, the data from the wireless receiver 34 is sent to a processor 36 for error correction and re-multiplexing as appropriate for use by a DVI transmitter 38. The processor 36 can also demultiplex any control signals for the display from within the video data as might be necessary. The DVI transmitter 38 operates in accordance with DVI principles known in the art to process the encrypted multimedia without ever decrypting it, and to send the multimedia data over a cable or other wire 39 to a HDMI receiver 40 that may be part of a media player 42, such as a DVD player or TV or other player. The HDMI receiver 40 decrypts the multimedia data in accordance with HDCP principles and demultiplexes the audio data from the video data. The multimedia content may then be displayed on a display 44, such as a cathode ray tube (CRT), liquid crystal display (LCD), plasma display panel (PDP), or TFT, or projector with screen, etc.

According to the present invention, the DVI receiver 20, processor 22, and wireless transmitter 24 may be contained on a single chip, or on separate substrates. Indeed, the DVI receiver 20, processor 22, and wireless transmitter 24 may be integrated into the media receiver 16. Likewise, the wireless receiver 34, processor 36, and DVI transmitter 38 may be implemented on a single chip and may be integrated into the media player 42 if desired. In any case, the media receiver 16 and media player 42 and respective components preferably are co-located in the same space, owing to the preferred 60 GHz wireless transmission frequency, which cannot penetrate walls.

Because DVI components are used in the wireless portion of the communication path between the media receiver 16 (e.g., a set-top box) and the media player 42 (e.g., a TV or DVD player), no encryption keys (or concomitant licenses) are required for this portion. Also, because the multimedia is never decrypted in the wireless portion established between the DVI components 20, 38 inclusive, little or no regulatory concerns are implicated.

Figure 2:
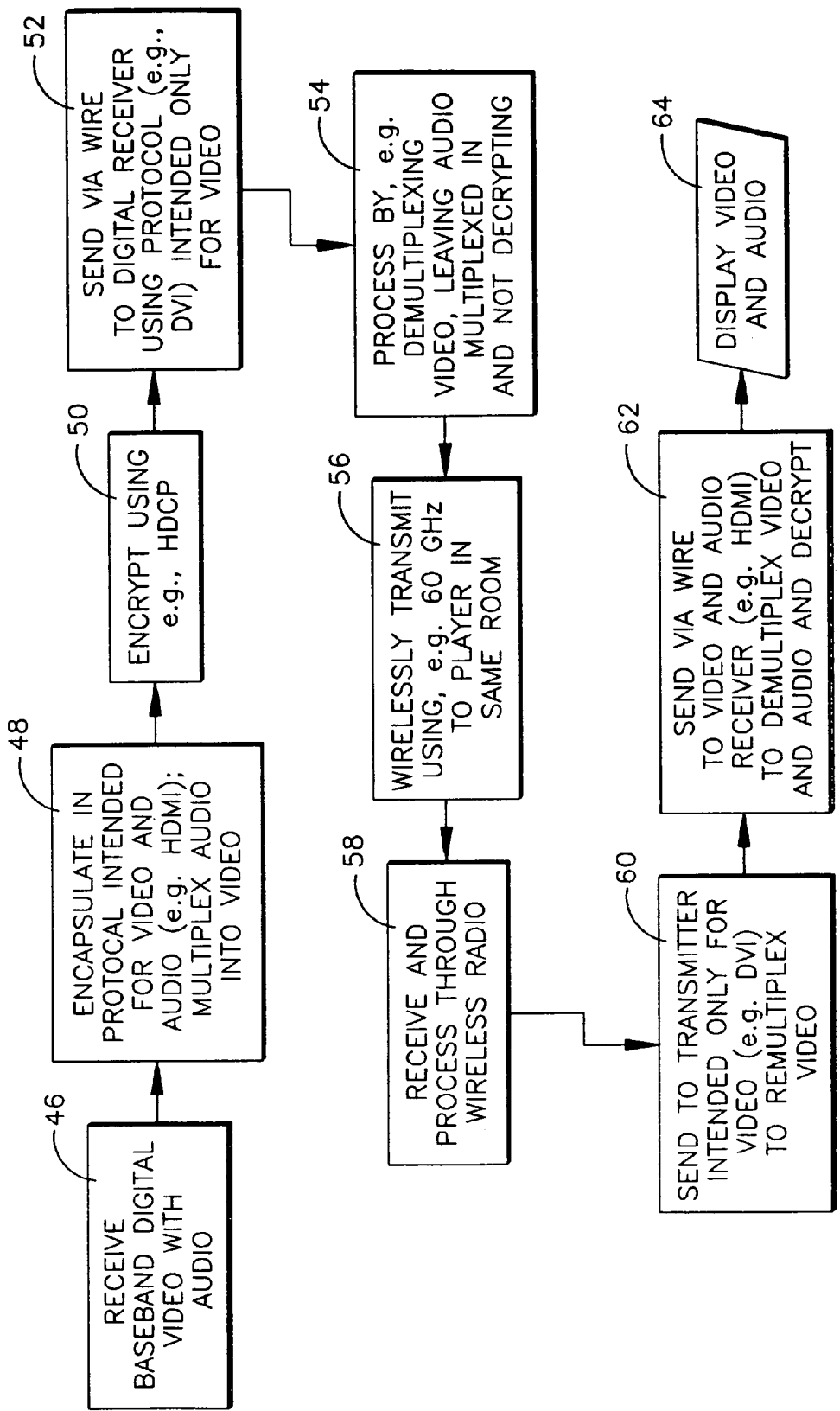
FIG. 2 is a flow chart of the present logic.

FIG. 2 illustrates the above operation in flow chart format. Commencing at block 46, the baseband digital multimedia (digital video with audio) is received, and at block 48 it is encapsulated in a digital protocol that is intended for both video and audio, e.g., HDMI. At block 50, the multimedia is encrypted using, for instance, HDCP principles known in the art. Moving to block 52, the encrypted multimedia data is sent via a wire to a digital receiver that uses a protocol such as DVI which is intended for video only. At block 54, the multimedia is processed by, for example, demultiplexing the video and leaving the audio multiplexed in the video. The multimedia is not decrypted at this point.

Moving to block 56, the multimedia is wirelessly transmitted to a player preferably in the same room or space as the transmitter, which advantageously may transmit at 60 GHz. The multimedia is received and processed at block 58 by a wireless radio, which sends the multimedia at block 60 to a transmitter such as a DVI transmitter that uses a protocol intended only for video, to remultiplex the video without decrypting it. Block 62 indicates that the video, still in encrypted form, is sent via a wire to a receiver such as a HDMI receiver that uses a protocol intended for both audio and video, where the audio is demultiplexed from the video and the multimedia data is decrypted. The multimedia stream is displayed at output parallelogram 64.

While the particular METHOD AND SYSTEM FOR WIRELESS DIGITAL VIDEO PRESENTATION as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

We claim:

1. A system, comprising:
    a source of multimedia data;
    a first High Definition Multimedia Interface (HDMI) component receiving the multimedia data from the source;
    a first Digital Visual Interface (DVI) component receiving, over at least one wire, the multimedia data from the first HDMI component, the multimedia data received by the first DVI component being encrypted using High-Bandwidth Digital Content Protection (HDCP), the first DVI component not decrypting or encrypting the multimedia data at any point;
    a wireless transmitter receiving encrypted multimedia data from the first DVI component and wirelessly transmitting the encrypted multimedia data to a wireless receiver, the encrypted multimedia data from the first DVI component including audio data multiplexed within a video data stream;
    a second DVI component receiving encrypted multimedia data from the wireless receiver;
    a second HDMI component receiving encrypted multimedia data from the second DVI component; and
    a displayer of multimedia data receiving multimedia data from the second HDMI component via at least one wire for display thereof.

2. The system of claim 1, further comprising:
    means for multiplexing control data related to the displayer into the multimedia data;
    means for processing the multimedia data to render it suitable for wireless transmission;
    means for processing multimedia data received wirelessly; and
    means for demultiplexing the control data from the multimedia data.

3. The system of claim 1, wherein the displayer of multimedia data is mounted in a room in which the wireless transmitter is disposed, the wireless transmitter wirelessly transmitting the multimedia data at approximately sixty Gigahertz (60 GHz).

4. The system of claim 1, wherein the multimedia data is high definition (HD) multimedia data.

5. The system of claim 1, wherein the control data is multiplexed in the blanking interval of the multimedia data.

6. The system of claim 1, wherein the audio data is multiplexed in a blanking interval of the video data stream.

7. The system of claim 1, wherein the audio data is multiplexed with the video data stream using the falling edge of a clock signal.

8. The system of claim 1, wherein the displayer of multimedia data is a plasma display.

9. The system of claim 1, wherein the displayer of multimedia data is a liquid crystal display.

\* \* \* \* \*